United States Patent
Hoff et al.

(10) Patent No.: US 7,006,215 B2
(45) Date of Patent: *Feb. 28, 2006

(54) SHAPED ILLUMINATION GEOMETRY AND INTENSITY USING A DIFFRACTIVE OPTICAL ELEMENT

(75) Inventors: Louis B. Hoff, Belmont, CA (US); Mark F. Oldham, Los Gatos, CA (US)

(73) Assignee: Applera Corporation Applied Biosystems Group, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/837,616

(22) Filed: May 4, 2004

(65) Prior Publication Data

US 2005/0002026 A1  Jan. 6, 2005

Related U.S. Application Data

(63) Continuation of application No. 09/964,778, filed on Sep. 28, 2001, now Pat. No. 6,744,502.

(51) Int. Cl.
*G01J 3/30* (2006.01)
(52) U.S. Cl. ................ 356/317; 362/268; 359/559
(58) Field of Classification Search ............... 356/317, 356/300, 305; 362/268; 359/559, 619, 620, 359/629, 642, 565, 15, 20
See application file for complete search history.

(56) References Cited

U.S. PATENT DOCUMENTS

| | | | |
|---|---|---|---|
| 3,407,294 A | 10/1968 | Hill | 359/399 |
| 3,754,814 A | 8/1973 | Leith | 350/162 |
| 4,833,827 A | 5/1989 | Bode et al. | 49/280 |
| 4,869,593 A | 9/1989 | Biegen | 356/351 |
| 4,904,081 A | 2/1990 | Miyahara | 356/152 |
| 5,024,494 A | 6/1991 | Williams et al. | 350/3.6 |
| 5,228,051 A | 7/1993 | Matthews | 372/107 |
| 5,414,559 A | 5/1995 | Burghardt et al. | 359/623 |
| 5,420,611 A | 5/1995 | Sarraf | 342/264 |
| 5,436,134 A | 7/1995 | Haugland et al. | 435/34 |
| 5,461,475 A | 10/1995 | Lerner et al. | 356/300 |
| 5,534,386 A | 7/1996 | Petersen et al. | 430/320 |
| 5,538,848 A | 7/1996 | Livak et al. | 435/5 |
| 5,541,779 A | 7/1996 | Choi | 359/885 |
| 5,662,410 A | 9/1997 | Suganuma | 362/268 |
| 5,701,132 A | 12/1997 | Kollin et al. | 345/8 |
| 5,710,631 A | 1/1998 | Bou-Ghannam et al. | 356/351 |
| 5,723,591 A | 3/1998 | Livak et al. | 536/22.1 |
| 5,741,411 A | 4/1998 | Yeung et al. | 204/452 |
| 5,768,017 A | 6/1998 | King et al. | 359/559 |

(Continued)

FOREIGN PATENT DOCUMENTS

WO  WO 97/36681  10/1997

(Continued)

OTHER PUBLICATIONS

Grossman et al., "Capillary Electrophoresis Theory and Practice," Academic Press, Chapter 1, pp. 3-43, 1992.

(Continued)

*Primary Examiner*—Layla G. Lauchman
(74) *Attorney, Agent, or Firm*—Finnegan, Henderson, Farabow, Garrett & Dunner, LLP

(57) ABSTRACT

A method and apparatus to illuminate a target. The apparatus can comprise a first lens configured to receive light from the light source, a diffractive optical element configured to receive the light from the first lens and to regulate the light into regulated light, and second lens configured to receive the regulated light and to direct the regulated light onto a selected area of the target.

59 Claims, 4 Drawing Sheets

U.S. PATENT DOCUMENTS

| | | | |
|---|---|---|---|
| 5,790,727 A | 8/1998 | Dhadwal et al. | 385/38 |
| 5,801,155 A | 9/1998 | Kutyavin et al. | 514/44 |
| 5,812,287 A | 9/1998 | Vivarelli | 359/2 |
| 5,880,861 A | 3/1999 | Nishida | 359/2 |
| 5,938,308 A | 8/1999 | Feldman et al. | 353/42 |
| 5,956,106 A | 9/1999 | Petersen et al. | 349/64 |
| 6,002,520 A | 12/1999 | Hoch et al. | 359/565 |
| 6,017,434 A | 1/2000 | Simpson et al. | 204/612 |
| 6,023,540 A | 2/2000 | Walt et al. | 385/12 |
| 6,069,737 A | 5/2000 | Fetzer et al. | 359/558 |
| 6,072,631 A | 6/2000 | Guenther et al. | 359/569 |
| 6,074,616 A | 6/2000 | Buechler et al. | 422/104 |
| 6,081,381 A | 6/2000 | Shalapenok et al. | 359/619 |
| 6,084,102 A | 7/2000 | Kutyavin et al. | 548/100 |
| 6,091,502 A | 7/2000 | Weigl et al. | 356/416 |
| 6,111,670 A | 8/2000 | Hattori et al. | 359/15 |
| 6,126,899 A | 10/2000 | Woudenberg et al. | 422/50 |
| 6,141,123 A | 10/2000 | Nakashima et al. | 359/3 |
| 6,151,143 A | 11/2000 | Hart | 359/35 |
| 6,163,390 A | 12/2000 | Kanda et al. | 359/28 |
| 6,175,431 B1 | 1/2001 | Waldern et al. | 359/15 |
| 6,236,945 B1 | 5/2001 | Simpson et al. | 702/20 |
| 6,272,939 B1 | 8/2001 | Frye et al. | 73/864.81 |
| 6,431,731 B1 | 8/2002 | Krietzman | 362/259 |

FOREIGN PATENT DOCUMENTS

| | | |
|---|---|---|
| WO | WO 00/58715 | 10/2000 |

OTHER PUBLICATIONS

Ferguson et al., "High-Density Fiber-Optic DNA Random Microsphere Array," Analytical Chemistry vol. 72, No. 22, pp. 5618-5624, Nov. 2000.

Steemers et al., "Screening Unlabeled DNA Targets with Randomly Ordered Fiber-Optic Gene Arrays," Nature Biotechnology, vol. 18, pp. 91-94, Jan. 2000.

Walt, "Bead-Based Fiber-Optic Arrays," Science, vol. 287, pp. 451-452, Jan. 2000.

Alphey, "DNA Sequencing From Experimental Methods to Bioinformatics," BIOS Scientific Publishers, Chapter 7, pp. 63-79, 1997.

Novotny, "Capillary Electrophoresis," Biotechnology, 7:29-34, 1996.

Marziali et al., "New DNA Sequencing Methods," Annu. Rev. Biomed. Eng. 3:195-223, 2001.

Dolnik, "DNA Sequencing by Capillary Electrophoresis (review)," J. Biochem. Biophys. Methods 41, pp. 103-119, 1999.

Johansson et al., "Robust Design Method for Highly Efficient Beam-Shaping Diffractive Optical Elements Using an Iterative-Fourier-Transform Algorithm with Soft Operations," Journal of Modern Optics, vol. 47, No. 8, pp. 1385-1398, 2000.

Mir et al., "Sequence Variation in Genes and Genomic DNA: Methods for Large-Scale Analysis," Annu. Rev. Genomics Hum. Genet., 1:329-360, 2000.

Fitch et al., "Genomic Engineering: Moving Beyond DNA Sequence to Function," IEEE, vol. 88, No. 12, pp. 1949-1971, Nov. 2000.

Kennedy et al., "Fast Analytical-Scale Separations by Capillary Electrophoresis and Liquid Chromatography," Chem. Rev. 99, pp. 3081-3131, Sep. 1999.

Sambrook et al., "Molecular Cloning: A Laboratory Manual," Cold Spring Harbor Laboratory Press, 2nd Edition, Chapter 5, pp. 5.1-5.95, 1989.

A

B

SHAPED ILLUMINATION GEOMETRY AND INTENSITY USING A DIFFRACTIVE OPTICAL ELEMENT

This is a continuation of application Ser. No. 09/964,778, filed Sep. 28, 2001 now U.S. Pat. No. 6,744,502, which is incorporated herein by reference.

I. FIELD OF THE INVENTION

This invention relates to methods and optical systems for illuminating a target. The present invention also relates to methods and systems for performing sample assays, and for producing and measuring optical responses and signatures.

II. BACKGROUND OF THE INVENTION

Targets, such as areas where optically transduced chemical and/or biochemical assays are performed, may need to be illuminated by a light source. It is often desirable to illuminate the target with light having enhanced uniformity of intensity over the entire target region. Optical signals are typically a function of the illumination intensity and, the more an illumination intensity varies across a target, the more the optical signal will also vary. The resultant variance in optical signals may be undesirable.

However, it can be difficult to efficiently provide illumination having enhanced or a high degree of uniformity. For example, lasers, which are commonly used for illuminating targets, typically have an intensity profile that is peaked at its center and which drops off radially towards the edges. This intensity profile is often a Gaussian, or bell shaped, profile. Therefore, if a target is directly illuminated with such a laser, the illumination of the target will not have a constant intensity. Rather, the center portion of the target will receive greater illumination intensity than the perimeter areas.

Therefore, there is a need for an apparatus and method to illuminate a target or selected area with enhanced uniformity as compared to directly illuminating the target with a given light source. Further, there is a need for an apparatus and method that provides enhanced illumination uniformity for optical targets such as those in chemical and/or biochemical assay systems.

III. SUMMARY OF THE INVENTION

According to certain embodiments of the invention, an apparatus is provided to illuminate a target. The apparatus comprises a light source, a first lens, a diffractive optical element, and a second lens. The first lens is configured to receive light from the light source. The diffractive optical element is configured to receive the light from the first lens and to regulate the light into regulated light. The second lens is configured to receive the regulated light and to direct the regulated light onto a selected area of the target.

According to certain embodiments of the invention, a method is provided to illuminate a target. The method comprises generating light from a light source, directing the light with a first lens to a diffractive optical element, generating regulated light with the diffractive optical element, and focusing the regulated light with a second lens onto a selected area of the target.

According to yet another aspect of the present invention, the inventive apparatus and method provide non-normal angle of incidence illumination of a selected area with a given light source with a greater degree of uniformity than is achieved when that light source is used to directly illuminate the selected area at the same non-normal angle of incidence.

According to certain embodiments of the present invention, the inventive apparatus and method are directed towards the analysis of a sample in which light is generated from a light source, the light is directed with a first lens to a diffractive optical element; regulated light is generated with the diffractive optical element; the regulated light is delivered onto a selected area of a target that comprises at least one optically active species; and changes in an optical signature of the at least one optically active species are detected.

It is to be understood that both the foregoing general description and the following detailed description are exemplary and explanatory only and are not restrictive of the invention, as claimed.

IV. BRIEF DESCRIPTION OF THE DRAWINGS

The accompanying drawings, which are incorporated in and constitute a part of this specification, illustrate several embodiments of the invention.

Figure 3:
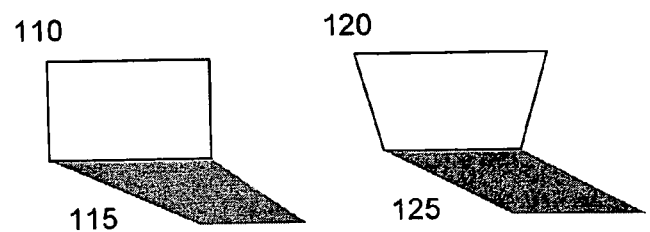
Figure 3:
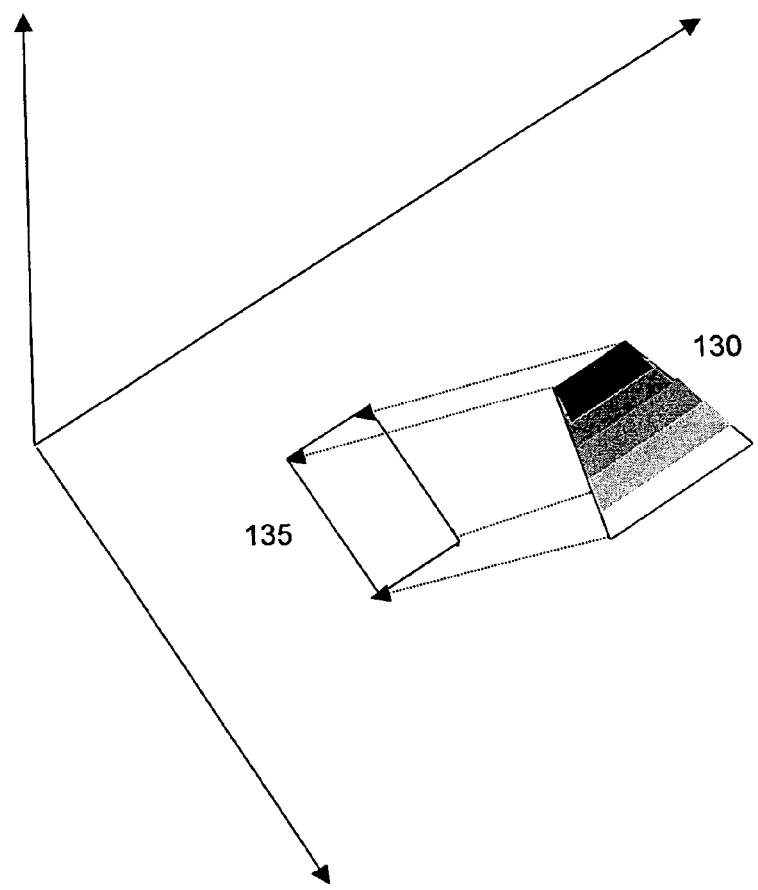

FIGS. 3A and B illustrate the distortive effect of non-normal angle illumination of a selected area and the use of regulated light to compensate for this effect in order to more uniformly illuminate a selected area of a given shape.

Figure 4:
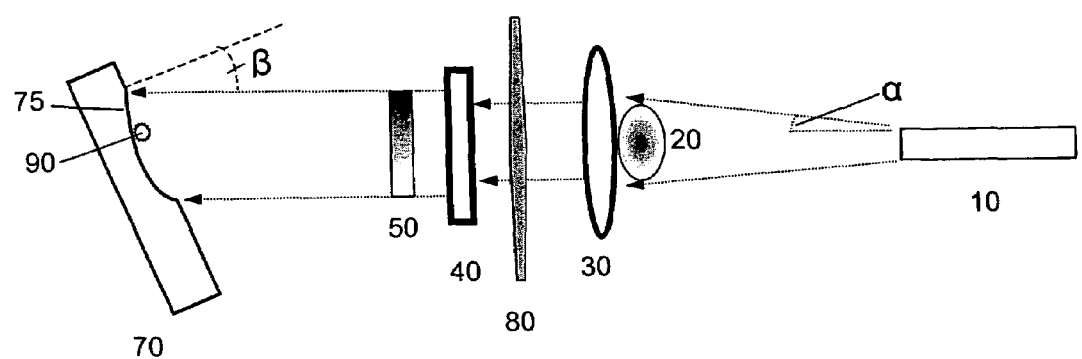

FIG. 4 is a schematic illustration of an embodiment according to the present invention, having an optical diffuser for removing speckle arranged between the first lens and the diffractive optical element.

V. DESCRIPTION OF CERTAIN EMBODIMENTS OF THE INVENTION

Reference will now be made in detail to certain embodiments of the invention, examples of which are illustrated in the accompanying drawings. Wherever possible, the same reference numbers will be used throughout the drawings to refer to the same or like parts.

The section headings used herein are for organizational purposes only, and are not to be construed as limiting the subject matter described. All documents cited in this application, including, but not limited to patents, patent applications, articles, books, and treatises, are expressly incorporated by reference in their entirety for any purpose.

It should be understood that the phrases "uniform illumination" and "uniformly illuminate," as used herein with respect to the illumination of a selected region, refer to the variation in optical intensity of the light across the selected region. The lower the variation, the more uniform the illumination. Thus, uniform illumination can be characterized qualitatively as a relative measurement. The variation of the illumination can also be characterized quantitatively, for example, by the relative deviation of the optical intensity ("intensity variation") across the selected region, with smaller intensity variations meaning that the illumination has a higher degree of uniformity.

The relative deviation of the intensity can be found from the ratio of the standard deviation of the intensity to the mean value of the intensity, each measured within the selected region. The relative deviation may also characterize a scaled intensity variation, which is calculated from the ratio of the standard deviation of a scaled intensity to the mean value of the scaled intensity, each measured within the selected region. The scaling factor may be, for example, the relative depth of each point in the selected region. The selected region may be selected target(s), selected area(s), and any selected location(s) or device(s), and may be a single continuous area or multiple spatially separated areas.

According to certain embodiments, the relative deviation can be measured by dividing the selected area into a plurality of sub-areas or points, measuring a local optical intensity at each sub-area or point, determining from the plurality of local measurements a mean local optical intensity and a standard deviation of the mean, and determining the relative deviation as a ratio of the standard deviation to the mean. According to certain embodiments, the relative deviation may also be expressed in terms of percent relative deviation, by determining the product of 100 and the ratio of the standard deviation to the mean.

According to certain embodiments, the relative deviation can be measured using, for example, a light detection device, such as a two-dimensional, multi-element photodetector, such as a Charge Coupled Device (CCD). In certain embodiments, the local optical intensity can be measured at some or all of the multiple elements of the photodetector, and the relative deviation can be determined therefrom.

The phrases "substantially uniform illumination" and "substantially uniformly illuminate," as used herein, mean that the uniformity of the illumination of the selected region is greater (and its intensity variation is less) than the uniformity of the light as initially emitted from the light source. That is, for a given light source, the illumination uniformity in the selected region using substantially uniform illumination is greater than the illumination uniformity that results from the direct illumination of the selected region with the given light source. For example, if the light source is a laser that emits light with a Gaussian intensity distribution, the uniformity of the substantially uniform illumination at the selected region is greater than a Gaussian distribution. Likewise, if the light source has a radial intensity distribution of 1/r, the uniformity of the substantially uniform illumination at the selected region is greater than a 1/r distribution.

The light intensity uniformity for "substantially uniform illumination" and "substantially uniformly illuminate" may also be scaled by the shape, including the depth, of the selected region. Thus, for example, if the selected region includes one or more wells with a curved depth profile, the uniformity of the substantially uniform illumination can be matched to the curved profile and, for example, provide more intense illumination where the well is deeper and less intense illumination where the well is shallower. In this case, if the intensity distribution is scaled by, for example, the variable depth of the selected region, the scaled intensity distribution will be substantially uniform, meaning that it is at least greater than the uniformity of the light intensity as initially emitted from the light source when similarly scaled.

The terms "intensity profile" and "light intensity distribution" as used herein in reference to light, refer to the distribution of optical intensity in the cross-sectional area of the light, where the cross-section is perpendicular to the light's propagation axis. As is the case with illumination, the intensity profile may have a given degree of uniformity, as measured, for example, by the relative deviation of the optical intensity (i.e., intensity variation) in the cross-sectional area. An intensity profile may have any number of characteristics, including, but not limited to, shape, total intensity, maximum intensity, minimum intensity, mean intensity, and intensity variation. An intensity profile thus may have any cross-sectional shape and any distribution of optical intensity in the cross-sectional area. For example, an intensity profile may be substantially uniform, that is, having essentially no measurable intensity variation in the cross-sectional area of the light. Additionally, an intensity profile may have a gradient intensity profile, in which case the optical intensity in the cross-sectional area will contain a range of intensities, where the range of intensities changes in a gradient or gradated pattern from one level of intensity to another level of intensity.

"Illumination efficiency," as used herein, refers to the optical intensity incident on the selected area relative to light emitted by the light source. In certain embodiments, illumination efficiency can be measured, for example, by measuring with a photodetector the intensity of light incident on the selected area and the intensity of light emitted from the light source, and taking the ratio of these two measurements. According to certain embodiments, the illumination efficiency may be expressed in terms of percent relative illumination efficiency, by determining the product of 100 and the ratio of the optical intensity incident on the selected area relative to optical intensity emitted from the light source.

"Numerical aperture," as used herein, refers to a measure specifying the resolving power of an optical lens system, calculated by multiplying the refractive index of the medium occupying the lens system space by the sine of the angle between the most oblique ray entering the lens system and the optical axis. "F-number," as used herein, is the expression denoting the ratio of the equivalent focal length of a lens to the diameter of its entrance pupil, and is equivalent to $1/(2\ NA)$, where NA is the numerical aperture. "Depth of field," as used herein, refers to the distance range over which light can be focused on a given subject while providing adequate definition and/or clarity.

The term "edge sharpness," as used herein, refers to the change in intensity at the edge of the region selected for illumination. According to certain embodiments of the present invention, the edge sharpness optionally may be selected to be greater than the edge sharpness of the light as emitted from the light source. For example, if the light source is a laser source emitting light with a Gaussian intensity distribution, the edge sharpness of the regulated light optionally may be selected to be greater (that is, change more quickly at the edge of the selected region) than the originally emitted light. Additionally, the regulated light may have, for example, an edge sharpness that is approximately square shaped. The regulated light may have, for example, an edge sharpness that is matched to the shape, including the depth, of the selected region. Thus, for example, if the selected region includes one or more wells with curved depth profiles, the edge sharpness optionally can be matched to the curved profile of the one or more wells in order to provide more intense illumination where the well is deeper and less intense illumination where the well is shallower. Of course, the inverse intensity distribution (that is, more intense where the well is shallow and less intense where it is deep) is also possible.

The term "optically active species," as used herein, refers not only to species that rotate the plane of vibration of plane-polarized light (e.g. birefringent species), but also to species that interact with light and which at least one of absorb light (e.g., dyes) and emit light (e.g. fluorophores or other luminescent species, quantum dots, and colloidal particles). As used herein, it is understood that "light," "optical," and grammatical variants thereof are not limited to visible radiation. For example, "light" and "optical" include, but are not limited to, ultraviolet (UV), visible, and infrared (IR) radiation.

"Luminescence" and grammatical variations thereof, as used herein, refers to the process of absorbing light followed by subsequently emitting light at a different wavelength. Luminescence thus includes both fluorescence and phosphorescence, as well as both single and multi-photon processes.

"Optical signature," as used herein, refers to the specific interactions of an optically active species with light. For example, if the optically active species absorbs light, the absorption spectrum of the species would be a component of its optical signature. Additionally, if the optically active species emits light, the emission spectrum of the species would be a component of its optical signature. The optical signature may, of course, have any number of components. Measurement of an optical signature, however, may include only the measurement of a single component or subcomponent of the optical signature.

The optical signature of an optically active species may change. For example, it may change in response to changes in its environment, its interaction with another optically active species, and/or its response to optical excitation. A change in optical signature can occur due to a number of different mechanisms, including, but not limited to, the binding of a dye-tagged analyte to the optically active species or substrate carrying the optically active species, the production of a dye species on or near the optically active species, the destruction of an existing dye species, a change in optical signal upon analyte interaction with a dye on the optically active species or substrate carrying the optically active species, or any other optical interrogatable event (i.e., anything that can be measured or probed with light). Changes in an optical signature are referred to herein as an "optical response," which is understood to further include any and all interactions of the optically active species with light (e.g., absorption, luminescence, birefringence). Measurement of an optical response, however, may include only the measurement of a single component or sub-component of the optical response, or a single change in the optical response.

An optically active species may comprise an "indicator molecule," which is understood to be any molecule which can be used to determine the presence of amplification product during or after an amplification reaction. The skilled artisan will appreciate that many indicator molecules may be used in the present invention. For example, according to certain embodiments, indicator molecules include, but are not limited to, fluorophores, radioisotopes, chromogens, enzymes, antigens, heavy metals, dyes, magnetic probes, phosphorescence groups, chemiluminescent groups, and electrochemical detection moieties.

A "fluorescent indicator" is any molecule or group of molecules designed to indicate the amount of amplification product by a fluorescent signal. In certain embodiments, such fluorescent indicators are "nucleic acid binding molecules" that bind or interact, e.g., through ionic bonds, hydrophobic interactions, or covalent interactions with nucleic acid. Complex formation with the minor groove of double stranded DNA, nucleic acid hybridization, and intercalation are all non-limiting examples of nucleic acid binding for the purposes of this invention. In certain embodiments, such fluorescent indicators are molecules that interact with double stranded nucleic acid. In certain embodiments, fluorescent indicators may be "intercalating fluorescent dyes," which are molecules which exhibit enhanced fluorescence when they intercalate with double stranded nucleic acid. In certain embodiments, "minor groove binding fluorescent dyes" may bind to the minor groove of double stranded DNA. In certain embodiments, fluorescent dyes and other fluorescent molecules can be excited to fluoresce by specific wavelengths of light, and then fluoresce in another wavelength. According to certain embodiments, dyes may include, but are not limited to, acridine orange; ethidium bromide; thiazole orange; pico green; chromomycin A3; SYBR® Green I (see U.S. Pat. No. 5,436,134); quinolinium, 4-[(3-methyl-2(3H)-benzoxazolylidene)methyl]-1-[3-(trimethylammonio)propyl]-, diiodide (YO-PRO®); and quinolinium, 4-[(3-methyl-2(3H)-benzothiazolylidene)methyl]-1-[3-(trimethylammonio)propyl]-,
diiodide (TOPRO®). SYBR® Green I, YOPRO®, and TOPRO® are available from Molecular Probes, Inc., Eugene, Oreg.

According to certain embodiments, the present invention provides an apparatus configured to illuminate a target. The apparatus comprises a light source, a first lens, a diffractive optical element, and a second lens. The first lens is configured to receive light from the light source. The diffractive optical element is configured to receive the light from the first lens and to regulate the light into regulated light. The second lens is configured to receive the regulated light and to direct the regulated light onto a selected area of the target.

According to certain embodiments, the present invention provides a method to illuminate a target. This method comprises generating light from a light source, directing the light with a first lens to a diffractive optical element, generating regulated light with the diffractive optical element, and focusing the regulated light with a second lens onto a selected area of the target.

Figure 1:
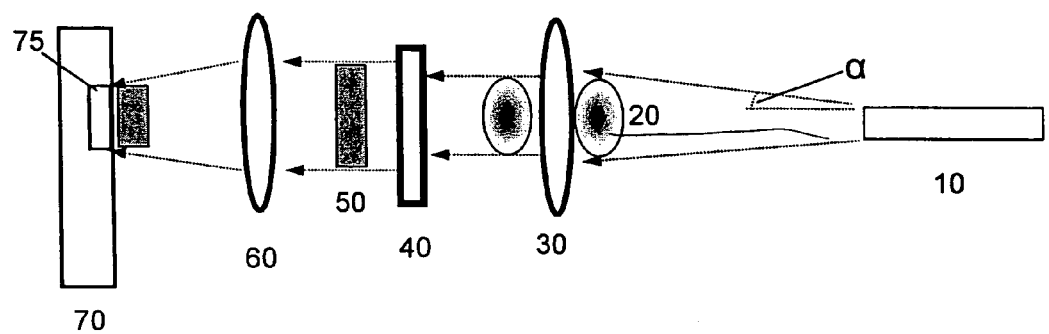
FIG. 1 is a schematic illustration of one embodiment of an apparatus of the present invention.

FIG. 1 schematically illustrates an apparatus according to certain embodiments of the invention. Light source 10 emits light 20, which is received by the first lens 30. The light 20 is directed by first lens 30 to the diffractive optical element 40. In these illustrative embodiments, the light 20 emitted from the light source 10 is divergent with an angle of divergence $\alpha$, and has an intensity profile that is brightest in the center, as shown by the shading profile, which is darkest at the center. In these illustrative embodiments, the first lens 30 is also configured to collimate the light 20, as shown schematically.

The diffractive optical element 40 receives the light 20 and regulates it into regulated light 50. In this illustrative embodiment, the regulated light 50 has an intensity profile that is substantially uniform, as shown by the substantially uniform shading profile. In these embodiments, the diffractive optical element 40 is also configured to reshape the light 20 from an elliptical shape into rectangular shaped regulated light 50. The second lens 60 receives the regulated light 50 and directs it onto a selected area 75 of the target 70. In this illustrative embodiment, the second lens 60 is configured to focus the regulated light 50 towards the selected area 75, as shown schematically.

In certain embodiments, the type and properties of the light source, first lens, diffractive optical element, and second lens may be chosen together, such that the desired shape, size, and/or uniformity is achieved for illumination of the target. Additional considerations for each of these elements will also be discussed below.

The light source may be any effective light source that, functionally, emits light. In certain embodiments, characteristics of the light source may include one or more characteristic chosen from, for example, a fixed or tunable output wavelength or wavelength range; a fixed or tunable output intensity; a stable, oscillating or pulsed output; a collimated or un-collimated output; a fixed or variable divergence; and a coherent or incoherent output.

According to certain embodiments, the light source may be wholly or partially coherent or incoherent, and may be chosen from, for example, at least one of the following non-limiting examples: a laser, an electroluminescent light source, a chemoluminescent light source, an electrochemoluminescent light source, an incandescent light source, a fluorescent light source, an arc lamp, and a light emitting diode. According to certain embodiments, the light source may also be chosen from continuous wave (CW) and pulsed lasers and from gas, solid state, fiber optical, and organic based lasers.

According to certain embodiments, the light source may comprise one or more light sources. For example, the light source may comprise a first light source and a second light source. In embodiments comprising more than one light source, the light sources may be independently chosen from any effective light sources. Additionally, in embodiments comprising more than one light source, such as first and second light sources, the first source may emit light having a first optical spectrum, which is different from a second optical spectrum of light emitted from the second light source. As used herein, optical spectrum include any spectrum having radiation wavelengths anywhere in at least one of the ultraviolet, visible, and infrared regions of the electromagnetic spectrum. According to certain embodiments, multiple light sources, including multiple light sources having different optical spectra, can be used, for example, to illuminate different optically active species having different absorption spectra and/or to perform wavelength based spectroscopic analysis. According to certain embodiments, multiple light sources, including multiple light sources having different optical spectra, can be used, for example, in a simultaneous or sequential manner.

According to certain examples, selection of the light source may be based, in whole or in part, on, for example, one or more of the properties of the light source, including a fixed or tunable output wavelength or wavelength range; a fixed or tunable output intensity; a stable, oscillating or pulsed output, a collimated or un-collimated output; fixed or variable divergence; and a coherent or incoherent output.

According to certain embodiments, the selection of the light source may also be based, in whole or in part, on one or more of the properties of the diffractive optical element, including its efficiency, its effective wavelength value or range, and its angular acceptance angle. According to certain embodiments, for example, the divergence of the light source may be matched to the angular acceptance of the diffractive optical element. According to certain embodiments, the selection of the light source may be based, in whole or in part, on one or more of the properties of the sample and/or the optically active species, including their optical properties, such as their absorption and scattering spectra. According to certain embodiments, the selection of the light source may be based, in whole or in part, on the combined properties of the optical system, including, for example, the collimating and/or diverging properties of the first lens in combination with the angular acceptance of the diffractive optical element.

According to certain embodiments of the present invention, the first lens may be configured to collimate the light from the light source, as shown schematically in FIG. 1. However, according to certain embodiments, the first lens may be configured to diverge or focus the light from the light source. According to certain embodiments, the first lens may be a lens system, which may be configured, for example, to collimate the light from the light source and/or to adjust the divergence of the light from the light source to match the angular acceptance of the diffractive optical element.

According to certain embodiments, the second lens may be configured to focus the regulated light to substantially match a size of the selected area, as shown schematically in FIG. 1. However, according to certain embodiments, the second lens may be configured to collimate or diverge the regulated light. According to certain embodiments, the second lens may be a lens system, which may be configured to collimate the regulated light and to reduce the regulated light to a size substantially matched to a size of the selected area. According to certain embodiments, the second lens may also comprise an objective lens, which may or may not be further configured to collect light from the selected area. According to certain embodiments, an objective lens may be used, for example, for either one or both of the non-normal axis illumination of the selected area and the collection of light (e.g., luminescent emission) from the selected area.

The first and second lenses of the apparatus may be independently chosen from any suitable optical element or combination of elements. Functionally, a lens bends light rays causing them to, for example, at least one of converge and diverge. A lens may be an object or group of objects, and may be at least one of reflective, refractive, and diffractive. According to certain embodiments, the first and second lenses may be independently selected from the following non-limiting examples: refractive optical elements, reflective optical elements, and diffractive optical elements. According to certain embodiments, the first and/or second lens may be combined integrally, such as on a surface, or non-integrally with one or more other optical elements, such as a diffractive optical element; a grating, such as a transmission grating; an optical filter; and a refractive element, such as a prism. According to certain embodiments, the first and/or second lens may be combined integrally, such as on a surface, or non-integrally with one or more other non-optical elements, such as a sample holder, a fluidic system, a mounting system, and/or a target. According to certain embodiments, the first and/or the second lens may be disposable. For example, the second lens may be integrally formed in a disposable sample holder and/or target, such as a sample holder and/or target made by, for example, injection molding.

According to certain embodiments, the first lens and the second lens may be chosen from one or more cylindrical lenses. According to certain embodiments, the cylindrical lens or lenses, may be used, for example, to selectively or preferentially adjust the divergence of light along one axis of the light. According to certain embodiments, at least one cylindrical lens may be used, for example, with a light source that emits elliptically shaped light.

According to certain embodiments, selection of the first and second lens and their properties may depend on one or more of the following non-limiting criteria: the properties of the light source, such as its wavelength and intensity; the diffractive optical element, including its diffractive properties; the sizes and shape, including divergence, of the regulated light; the size, shape, distance, and angle of the target; a depth of focus; a numerical aperture; an optically active species; a bandwidth of the light source; and the optical path lengths and angles within the apparatus, including the target distance.

Diffraction optical elements are optical elements that use diffraction (the bending of light as it passes an obstruction)

to control wavefronts. Diffractive optical elements include but are not limited-to diffraction gratings, surface-relief diffractive lenses, holographic optical elements and computer-generated holograms. Diffractive optical elements can be formed using, for example, at least one of diamond machining, interference of coherent beams (holography), injection molding, fixed and adjustable spatial light modulators, including, for example, liquid crystal spatial light modulators, and advanced microlithographic techniques.

The term diffractive diffuser, and grammatical variations thereof, as used herein is understood to mean an optical element that comprises at least one diffractive optical element but does not consist solely of, as the at least one diffractive optical element, a diffraction grating. In certain embodiments, a diffractive diffuser may diffract light in more than one dimension, such as, for example, two dimensions and three dimensions.

The term diffractive optical element, as used herein, encompasses both diffractive diffusers and diffractive optical elements that consist solely of a diffraction grating.

According to certain embodiments of the present invention, the diffractive optical element is configured to receive light of a given shape and intensity distribution, and to redistribute the light to produce a desired shape and/or intensity distribution. In certain embodiments, the redistribution of the light can be based on optical diffraction alone. In certain embodiments, the redistribution of the light can be based on optical diffraction in combination with other optical processes, such as optical reflection and/or refraction. Optical refraction is a change in the direction of propagation when a wave passes from one medium to another of different density or refractive index.

According to certain embodiments of the present invention, the diffractive optical element is configured to regulate the light received from the first lens. According to certain embodiments, functionally, the diffractive optical element is configured to receive light of a given shape and intensity distribution, and to redistribute the light to produce a desired shape and/or intensity distribution. The redistribution results from diffraction of the light by the diffraction optical element. The meaning of regulated light, as used herein, is light that has been redistributed from a first cross sectional shape and/or intensity distribution to a second cross sectional shape and/or intensity distribution.

According to certain embodiments, the redistribution may include wavelength dependent redistribution. In certain embodiments, for example, the relative wavelength distribution of the regulated light at a first point in its cross section may differ from at least one of (1) the relative wavelength distribution at a second point in its cross section and (2) an average wavelength distribution of the light received by the diffractive optical element.

According to certain embodiments, the redistribution may include no (or minimal) wavelength dependent redistribution. In certain embodiments, for example, the relative wavelength distribution of the regulated light at a first point in its cross section does not differ (or differ significantly for the purpose of illuminating the target) from at least one of (1) the relative wavelength distribution at a second point in its cross section and (2) an average wavelength distribution of the light received by the diffractive optical element.

According to certain embodiments, diffractive optical elements can give a desired intensity distribution in the diffraction plane. According to certain embodiments, these elements can be designed using a number of methods, including geometrical optics methods and iterative-Fourier-transform algorithms (IFTAs). IFTAs can be used to design diffractive optical elements producing any desired intensity distribution in the diffraction plane based on any intensity cross-section of the incident beam. See, for example, M. Johansson et al., "Robust design method for highly efficient beam-shaping diffractive optical elements using an iterative-Fourier-transform algorithm with soft operations," *Journal of Modern Optics*, 47(8), 1385–1398 (2000), the entirety of which is incorporated herein by reference for any purpose. According to certain embodiments, optical elements, and their combinations, including, for example, diffractive optical elements, can be designed using software packages, such as, for example, ZEMAX® from Focus Software, Inc.

Diffractive optical elements may include, e.g., holograms and holographic optical elements. According to certain embodiments, suitable diffractive optical elements include, for example, those chosen from amplitude (e.g., absorption) and phase holograms; optically etched diffractive optical elements; embossed diffractive optical elements; molded diffractive optical elements; chemically etched diffractive optical elements; thin or surface (2-dimensional) holographic optical elements and volume (3-dimensional) holographic optical elements; reflection and transmission holograms; multiplex holograms; rotating holograms, such as, for example, a rotating disc composed of a series of holographic optical elements that diffracts light at various angles, when spinning, for example, to generate a raster scan; Fresnel holograms; and combinations thereof.

According to certain embodiments, the diffractive optical element is configured to regulate the received light and compensate for at least one of light intensity distributions and shapes of the light due to at least one of the light source and interaction of the light with optical elements of the apparatus. As a non-limiting example, the diffractive optical element can be configured to redistribute the Gaussian intensity profile of light from a laser to another intensity profile, such as a more uniform intensity profile. As another non-limiting example, the diffractive optical element can be configured to redistribute the circular profile of light from a light source to another shape, such as a rectangular profile. As yet another non-limiting example, the diffractive optical element can be configured to compensate for aberrations, such as spherical and chromatic aberrations, such as those caused by the interaction of the light with optical elements of the apparatus.

According to certain embodiments, the diffractive optical element regulates the received light, having a given degree of uniformity, such that the output light has a greater degree of uniformity at the selected area of the target. According to certain embodiments, the enhanced uniformity may be measured with respect to the intensity distribution. That is, the output light may have a more uniform intensity distribution (measured at the selected area) than the received light (if the received light were transmitted to and measured at the selected area without being regulated by the diffractive optical element).

According to certain embodiments, the diffractive optical element may regulate the received light by reshaping the cross sectional profile of the light. For example, the diffractive optical element may reshape the received light from a generally circular or elliptical cross section to form regulated light having a generally rectangular cross section. Of course, the diffractive optical element may be configured to regulate received light having shapes other than circular, and to generate regulated light having shapes other than rectangular.

For example, as shown in FIG. 1, light 20 having an elliptical cross-section and an intensity distribution peaked in the center (as shown by darkened central shading) is regulated by the diffractive optical element 40 and regulated into regulated light 50 that has a rectangular cross-section and a constant intensity distribution (as shown by uniform shading). Of course, as discussed above, according to certain embodiments the light need not be regulated into regulated light having a constant intensity distribution.

The resultant intensity re-distributed and/or re-shaped light may or may not be immediately suitable for the illumination of the selected area of the target. For example, in certain embodiments, the diffractive optical element may be configured to not only post-compensate for effects of elements optically prior to the diffractive optical element but also to pre-compensate for effects of elements optically subsequent to the diffractive optical element. Thus, according to certain embodiments, the regulated light is most suitable for illumination of the selected area after it interacts with the second lens and/or other subsequent elements. Additionally, according to certain embodiments, the regulated light may be designed to allow for its propagation, including any changes in size, shape, and intensity distributions that result therefrom, prior to its illumination of the selected area.

According to certain embodiments, the diffractive optical element may be configured to produce regulated light that is less uniform than the received light but which, after interacting with subsequent optical elements and/or further propagation, is more uniform when it illuminates the sample. According to certain embodiments, the diffractive optical element may be configured to produce regulated light having a cross section that is not matched (in, for example, size and/or shape) to the selected area of the target but which, after interacting with subsequent optical elements and/or further propagation, is matched (in, for example, size and/or shape) to the selected area.

Certain embodiments of the apparatus may be configured to substantially uniformly illuminate the selected area without the regulated light interacting with a second lens. According to certain embodiments, such apparatuses may be advantageous to illuminate selected areas at distances that are large compared with the beam diameter. According to certain embodiments, such apparatuses may be advantageous to illuminate selected areas at distances that are at least 1.5 times as large as the beam diameter. According to certain embodiments, such apparatuses may be advantageous to illuminate selected areas at distances that are at least 2 times as large as the beam diameter. According to certain embodiments, such apparatuses may be advantageous to illuminate selected areas at distances that are at least 10 times as large as the beam diameter. According to certain embodiments, such apparatuses may be advantageous to illuminate targets comprising multiple, spatially separate selected areas.

Suitable diffractive optical elements include, but are not limited to, reconfigurable holographic optics, such as those disclosed in U.S. Pat. No. 6,175,431 to Waldern et al., which is incorporated by reference herein in its entirety for any purpose. Diffractive optical elements according to certain embodiments of the invention may be designed and selected for the specific application, and may be prepared according to methods including, but not limited to, those disclosed in U.S. Pat. No. 6,163,390 to Kanda et al., which is incorporated by reference herein in its entirety for any purpose. Diffractive optical elements for use in the present invention may also be produced by the methods disclosed in U.S. Pat. No. 6,151,143 to Hart et al., and U.S. Pat. No. 6,111,670 to Hattori et al., which are both incorporated by reference herein in their entirety for any purpose.

According to certain embodiments, light can be shaped into virtually any shape. According to certain embodiments, the regulated light may be shaped to match a size and shape of the selected area. Such embodiments typically provide efficient illumination of the selected area, since light is not wasted by illuminating an area larger than the selected area. According to certain embodiments, the regulated light may be shaped such that it will match a size of the selected target area after diverging or converging towards the target, such as, for example, after focusing of the regulated light by the second lens.

According to various embodiments, a selected area can be illuminated at virtually any angle of incidence. Thus, according to certain embodiments, the selected area may be illuminated at normal incidence (that is, at about 90° with respect to a surface plane of the selected area). According to certain embodiments, a selected area can be illuminated at a non-normal ("tilted" or "off-axis") angle of incidence. According to certain embodiments, a selected area, such as a selected area with a non-flat surface, can be illuminated at a range of angles, including normal and non-normal angles of incidence. Further, according to certain embodiments, the regulated light may be designed to compensate for the illumination of the selected area at a non-normal angle of incidence.

Figure 2:
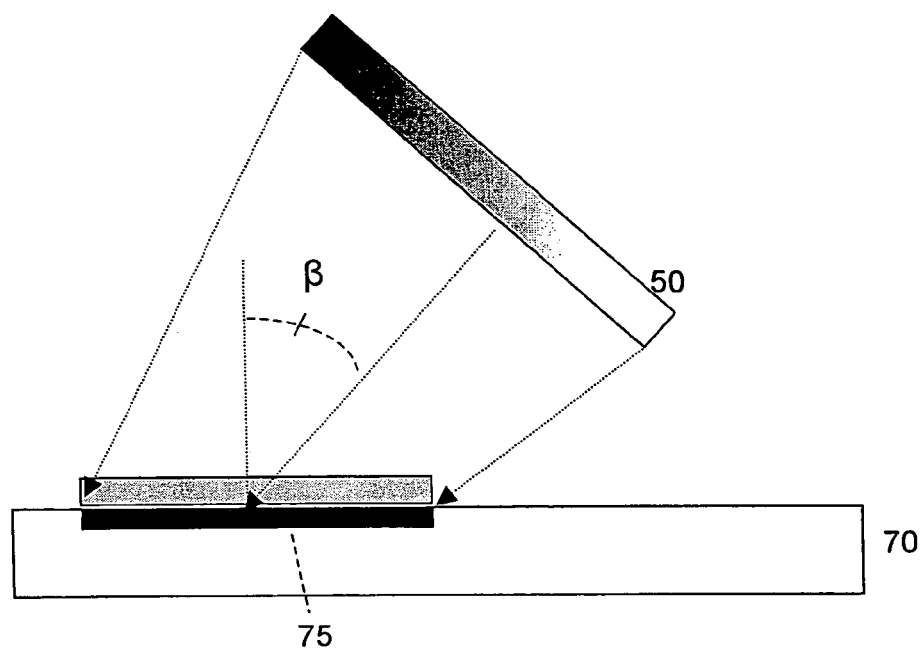
FIG. 2 is a schematic illustration of the illumination of a selected area at a non-normal angle of incidence, where the regulated light has a gradient intensity profile in order to provide substantially uniform illumination of the selected area at a non-normal angle of incidence.

To achieve substantially uniform illumination of a target, such as a tilted target, in certain embodiments, the diffractive optical element is configured to provide regulated light that has an intensity gradient. For example, according to certain embodiments, as shown by shading in FIG. 2, when the regulated light is converging towards the target at a non-normal angle of incidence, the intensity profile of the regulated light 50 is greater towards one edge (as shown by the darker shading, which indicates greater light intensity) in order to provide substantially uniform illumination intensity across the selected area 75 of the target 70, which is illuminated at an angle tilted from normal by angle β. In certain embodiments, the intensity gradient may be proportional to the tilt angle, with the graded intensity increasing towards the edge furthest away from the selected area.

According to certain embodiments, the apparatus may be configured to illuminate a selected area of a given shape at a normal or non-normal angle of incidence. For example, in certain embodiments, there can be non-normal illumination. In certain embodiments, if the selected area is, for example, square shaped, the regulated light would be shaped such that, when incident on the selected area at the non-normal angle of incidence, the light illuminates a square shaped area. Due to the non-normal angle of incidence, however, the regulated light will not necessarily have a square shaped profile.

According to certain embodiments, the non-normal angle illumination of a selected area with light of a given cross sectional profile has analogies with the shape distorted shadow of an object cast on to a surface at a non-normal angle. For example, as shown in FIG. 3A, a square object 110 can cast, at a non-normal angle, a shadow 115 that is a skewed trapezoid. Also, a trapezoidal object 120 can cast, at a non-normal angle, a shadow 125 that is a parallelogram. Thus, if a certain shaped shadow is desired (e.g., parallelogram), then the shape of the object can be selected or designed to produce this shadow when cast at a specific angle.

Similarly, in certain embodiments, the present invention may illuminate a rectangular shaped selected area of the target at a non-normal angle of incidence. According to certain embodiments, the diffractive optical element may be configured to generate trapezoidal shaped regulated light having an optical intensity gradient increasing toward a shorter parallel side of the trapezoidal shaped regulated light. For example, as shown in FIG. 3B, the trapezoidal shape and intensity gradient (shown, for the purpose of illustration, as a gradient in the form of stepped intensities as indicated by the range of colors from black, relatively more intense, to white, relatively less intense) of trapezoidal shaped regulated light 130 provides a more uniform illumination when the selected area is illuminated at a non-normal angle of incidence. Further, due to the non-normal angle of incidence, in such embodiments as shown, the use of a trapezoidally shaped regulated light 130 results in the illumination of a rectangular shaped area 135.

According to various embodiments, illumination can be provided with a range of intensity variations. For example, embodiments may be configured to illuminate the selected area with an intensity variation of 50% or less, including an intensity variation of 10% or less, including an intensity variation of 5% or less, including an intensity variation of 1% or less, and including an intensity variation at any value between 50% to less than 1%. According to certain embodiments, the selection of an appropriate intensity variation may take into account any one or more of the following non-limiting factors: the intensity variation of the light source, the requirements for the target illumination, and the type of diffractive optical element employed, as well as other factors such as size, cost, and tolerance limitations of the apparatus and/or method. According to certain embodiments, the intensity variation may be a scaled intensity variation.

According to certain embodiments, a range of illumination efficiencies for illumination of the selected area may be provided. For example, embodiments may be configured to direct at least 1% percent of the light from the light source onto the selected area, including at least 10% percent of the light, including at least 25% percent of the light, including at least 50% percent of the light, including at least 75% percent of the light, including at least 90% percent of the light, including at least 99% of the light and including any percent between 1% and 100%. According to certain embodiments, the selection of an appropriate illumination efficiency may take into account any one or more of the following non-limiting factors: the number and type of optical elements in the apparatus, including the light source and its intensity, and the intensity requirements for the sample illumination. In certain embodiments, one may factor in the type of power source for the system, where, for example, relatively high efficiencies may be desirable for battery powered operation.

In certain embodiments, the present invention may be configured to direct at least 10% percent of the light from the light source onto the selected area and to illuminate the selected area with an intensity variation of less than 25%. In certain embodiments, the present invention may be configured to direct any percent between 10% and 100% percent of the light from the light source onto the selected area and to illuminate the selected area with an intensity variation of any percent less than 25%.

In certain embodiments of the present invention, the apparatus may be configured to control a numerical aperture of the regulated light directed onto the selected area. In certain embodiments, such a design can be used to produce a selected depth of field and a selected edge sharpness.

According to various embodiments, virtually any target or selected area may be illuminated. For example, according to certain embodiments, the target may comprise at least one optical fiber bundle, including an optical fiber bundle comprising separate wells at terminal ends of optical fibers of the bundle, and including optical fiber bundles such as those disclosed in U.S. Pat. No. 6,023,540 to Walt et al., which is incorporated by reference herein in its entirety for any purpose. According to certain embodiments, the target may comprise at least one microcard, including, for example, those sold under the trade name TAQMAN® CYTOKINE GENE EXPRESSION CARDS by Applied Biosystems. According to certain embodiments, the target may comprise at least one of a substrate, fluidics network, and device, such as those disclosed in U.S. Pat. No. 6,126,899; WO application Ser. No. 97/36681; and U.S. Pat. No. 6,272,939, the disclosures of which are incorporated herein by reference in their entirety for any purpose. According to certain embodiments, the target may comprise at least one of a glass slide, target array, and microwell.

According to certain embodiments, the target may comprise at least one optically active species, including at least one optically active species chosen from quantum dots and colloidal particles. According to certain embodiments, one can configure targets to comprise at least one optically active species such that one can make measurements of the quantity and/or type and/or change in optical signature of the optically active species in order to measure a baseline and/or result in an assay.

According to certain embodiments, the target may also comprise at least one luminescent species, including at least one fluorescent species. Luminescent species emit light at a different wavelength than that which they absorb, which typically provides easy separation of the excitation light and the emission light.

According to certain embodiments, the target may comprises at least one recognition element. Functionally, a recognition element provides and/or has the ability to discriminate between one or more objects, such as one or more antigens. The discrimination may be due to any interaction, including, as non-limiting examples, physical, electrical, chemical, and biological interactions, as well as combinations thereof. In certain embodiments, the at least one recognition element may be chosen from chemical recognition elements and biochemical recognition elements. For example, the target may comprise recognition elements such as the functionalized, optically encoded micro spheres of Walt et al.

According to certain embodiments, the selected area of the target may have any shape, and may or may not be a single continuous area. For example, the selected area may be rectangular, including approximately 1 mm×1.5 mm.

According to certain embodiments, the selected area may comprise at least two or more spatially separate areas. For example, the selected area may be at least two wells separated by some distance, and, in certain embodiments of the present invention, the spatially separate wells but not the area between the wells, will be illuminated. In certain embodiments, the selected area may comprise the wells of a microtiter plate chosen from microtiter plates having 96, 128, 384, and 1536 wells. In certain embodiments, for example, the selected area may comprise multiple well plates such as those sold by Applied Biosystems under the trade names TAQMAN® CYTOKINE GENE EXPRESSION CARDS MICROAMP® 384-WELL REACTION PLATES, and MICROAMP® 96-WELL TUBES/TRAY/RETAINER ASSEMBLIES. According to certain embodiments, the spatially separate areas may be illuminated simultaneously, sequentially, and/or any combination thereof. In certain embodiments, rows of spatially separate areas may be illuminated sequentially.

According to certain embodiments, an apparatus is provided that can illuminate a target having microwells. In certain embodiments, the apparatus comprises a target comprising microwells, a light source, a first lens configured to receive light from the light source, a diffractive optical element configured to receive the light from the first lens and to regulate the light into regulated light, and a second lens configured to receive the regulated light and to direct the regulated light onto a selected area of the target. In certain embodiments, microwells are small assay wells. In certain embodiments, microwells are chosen from 96, 128, 384, 1536 well microtiter plates. In certain embodiments, microwells are chosen from those described in U.S. Pat. No. 6,023,540; J. A Ferguson et al., *Analytical Chemistry,* 72, 5618 (2000); F. J. Steemers et al., *Nature Biotechnology,* 18, 91–94 (2000); and D. R. Walt, *Science,* 287, 451–452 (2000), the disclosures of which are incorporated herein by reference in their entirely for any purpose.

According to certain embodiments, an apparatus is provided that can illuminate a target having chemically functionalized beads. In certain embodiments, the apparatus comprises a target comprising chemically functionalized beads, a light source, a first lens configured to receive light from the light source, a diffractive optical element configured to receive the light from the first lens and to regulate the light into regulated light, and a second lens configured to receive the regulated light and to direct the regulated light onto a selected area of the target. Chemically functionalized beads typically refer to beads, such as microspheres, that carry one or more functional groups capable of selective or semiselective chemical interaction with at least one species. Non-limiting examples of the functionalities of the one or more functional groups include a catalytic functionality, such as an enzymatic functionality; a binding or receptor functionality, such as that of an antibody; a reactive functionality, such as an oxidation-reduction reactivity; and functionalities that, in the presence of an analyte, change the optical signature of at least one of the bead, species associated with the bead, and species in a sample.

According to certain embodiments, an apparatus is provided that can illuminate a target having at least one self-quenching fluorescence probe. In certain embodiments, for example, the target may have an oligonucleotide probe which includes a fluorescent reporter molecule and a quencher molecule capable of quenching the fluorescence of the reporter molecule. In certain embodiments, the oligonucleotide probe can be constructed such that the probe exists in at least one single-stranded conformation when unhybridized where the quencher molecule is near enough to the reporter molecule to quench the fluorescence of the reporter molecule. In certain embodiments, the oligonucleotide probe can exist in at least one conformation when hybridized to a target polynucleotide where the quencher molecule is not positioned close enough to the reporter molecule to quench the fluorescence of the reporter molecule. By adopting these hybridized and unhybridized conformations, the reporter molecule and quencher molecule on the probe can, for example, exhibit different fluorescence signal intensities when the probe is hybridized and unhybridized. As a result, in certain embodiments it can be possible to determine whether the probe is hybridized or unhybridized based on a change in the fluorescence intensity of the reporter molecule, the quencher molecule, or a combination thereof. In addition, in certain embodiments because the probe can be designed such that the quencher molecule quenches the reporter molecule when the probe is not hybridized, the probe can be designed such that the reporter molecule exhibits limited fluorescence until the probe is either hybridized or digested. See, for example, U.S. Pat. Nos. 5,723,591; 5,801,155, and 6,084,102, the disclosures of which are incorporated herein by reference.

According to certain embodiments, the probes include fluorescent molecules attached to fluorescence quenching molecules by a short oligonucleotide. In certain embodiments, the probes with the fluorescent molecules bind to the target molecule, but are broken by the 5' nuclease activity of the DNA polymerase when they are replaced by the newly polymerized strand during PCR, or some other strand displacement protocol. When the oligonucleotide portion is broken, the fluorescent molecule is no longer quenched by the quenching molecule, and emits a fluorescent signal. An example of such a system has been described in U.S. Pat. No. 5,538,848, which is incorporated herein by reference, and is exemplified by the TaqMan™ molecule, which is part of the TaqMan™ assay system (available from Applied Biosystems).

According to certain embodiments, the probes may be "molecular beacons," which comprise a fluorescent molecule attached to a fluorescence-quenching molecules by an oligonucleotide. When bound to a polynucleotide as double stranded nucleic acid, the quenching molecule is spaced apart from the fluorescent molecule, and the fluorescent indicator may give a fluorescent signal. When the molecular beacon is single stranded, the oligonucleotide portion can bend flexibly, and the fluorescence-quenching molecule can quench the fluorescent molecule, reducing the amount of fluorescent signal. Such systems are described in U.S. Pat. No. 5,723,591, which is incorporated herein by reference.

According to certain embodiments, an apparatus is provided that can illuminate a target configured for at least one of hybridization and electrophoresis. Hybridization is the pairing of complementary nucleic acid strands to make double stranded molecules. Exemplary hybridization is described in Sambrook et al., eds., Molecular Cloning: A Laboratory Manual, $2^{nd}$ Edition, Chapter 5, Cold Spring Harbor Laboratory Press (1989); Grossman and Colburn, Capillary Electrophoresis Theory and Practice, Chapter 1, Academic Press (1992); *Annu. Rev. Biomed. Eng,* 3:195–223 (2001); *Proc. IEEE,* 88(12) 1949–1971 (2000); and *Annu. Rev. Genomics Hum. Genet.* 1:329–60 (2000); Alphey, DNA Sequencing, Chapter 7, BIOS Scientific Publishers Limited (1997), the disclosures of which are incorporated herein by reference in their entirety for any purpose. Electrophoresis is a process in which electrically charged particles that are suspended in a solution move through the solution under the influence of an applied electric field. Exemplary electrophoresis is described in Grossman and Colburn, Capillary Electrophoresis Theory and Practice, Chapter 1, Academic Press (1992); *Annu. Rev. Biomed. Eng,* 3:195–223 (2001); *Chem. Rev.* 99, 3081–3131 (1999); *Proc. IEEE,* 88(12) 1949–1971 (2000); *J. Biochem. Biophys. Methods* 41, 103–119 (1999); Novotny, Capillary Electrophoresis, Biotechnology, 7:29–34 (1996); and U.S. Pat. Nos. 5,741,411, 6,236,945, 5,790,727, and 4,833,827, the disclosures of which are incorporated herein by reference in their entirety for any purpose.

According to certain embodiments, an apparatus is provided that can illuminate a target having a target array. In certain embodiments, the apparatus comprises a target comprising a target array, a light source, a first lens configured to receive light from the light source, a diffractive optical element configured to receive the light from the first lens and to regulate the light into regulated light, and a second lens configured to receive the regulated light and to direct the regulated light onto a selected area of the target. A target array is understood to be a target composed of more than one sub targets. Non-limiting examples of target arrays include the multiple fiber wells disclosed in Walt et al.; U.S. Pat. No. 6,023,540, J. A Ferguson et al., *Analytical Chemistry,* 72, 5618 (2000); F. J. Steemers et al., *Nature Biotechnology,* 18, 91–94 (2000); and D. R. Walt, *Science,* 287, 451–452 (2000), the disclosures of which are incorporated herein by reference in their entirely for any purpose.

According to certain embodiments an apparatus is provided that is configured to perform an assay on a sample. In certain embodiments, the apparatus comprises a target configured to receive the sample, a light source, a first lens configured to receive light from the light source, a diffractive optical element configured to receive the light from the first lens, and to regulate the light into regulated light, and a second lens configured to receive the regulated light and to direct the regulated light onto a selected area of the target. According to various embodiments, the sample may be in any form, such as solid, liquid, gas, and mixtures thereof. Non-limiting examples of such samples include blood and samples derived from blood, samples of proteins, samples of nucleic acids, air samples, and/or solutions comprising antibodies and/or antigens. According to certain embodiments, at least one of the target and the sample comprises at least one optically active species. According to certain embodiments, at least one of the target and the sample comprises at least one fluorescent species.

According to certain embodiments, the sample may comprises a "biological sample," which is used in a broad sense and is intended to include a variety of biological sources that contain nucleic acids. Such sources include, without limitation, whole tissues, including biopsy materials and aspirates; in vitro cultured cells, including primary and secondary cells, transformed cell lines, and tissue and cellular explants; whole blood, red blood cells, white blood cells, and lymph; and body fluids such as urine, sputum, semen, secretions, eye washes and aspirates, lung washes and aspirates. According to certain embodiments, samples comprising fungal and/or plant tissues, such as leaves, roots, stems, and caps, are also within the scope of the present invention. According to certain embodiments, samples comprising microorganisms and/or viruses that may be present on or in a biological sample are within the scope of the invention.

According to certain embodiments, an apparatus is provided that is configured to perform an assay on a sample. According to certain embodiments, as shown in FIG. 4, the apparatus comprises a target 70 configured to receive the sample. According to certain embodiments, the target may comprise a sample holder and/or a sample. The apparatus further comprises a light source 10, a first lens 30 configured to receive light 20 from the light source 10, and a diffractive optical element 40. The diffractive optical element 40 is configured to receive the light 20 from the first lens 10, to regulate the light 20 into regulated light 50, and to direct the regulated light onto the selected area 75 of the target 70. As illustrated by the gradated shading of regulated light 50, the regulated light may have an intensity gradient to provide more uniform illumination intensity (as compared with light having no intensity gradient) to the selected area 75 when illuminated at a non-normal angle of incidence, β. In certain embodiments, the regulated light 50 may be shaped with a shape that matches the selected area after illumination of the selected area at a non-normal angle of incidence. According to various embodiments, a second lens, configured to direct the regulated light onto the selected area, is optional.

According to certain embodiments, as shown in FIG. 4, the selected area 75 may be a well, such a well configured to receive a sample. According to certain embodiments, at least one of the target and the sample comprises at least one optically active species 90. According to certain embodiments, the optically active species 90 comprises at least one fluorescent species.

In certain embodiments, an apparatus optionally may include an optical diffuser configured to remove speckle, such as speckle due to the interference of coherent light. According to certain embodiments, as shown in FIG. 4, an optical diffuser 80 may be located between the first lens 30 and the diffractive optical element 40. The optical diffuser, however, may be placed anywhere within the apparatus. According to certain embodiments, the optical diffuser may be any suitable optical element which is useful for removing speckle. In certain embodiments, the optical diffuser may comprise at least one of a rotating optical diffuser and a light shaping optical diffuser (LSD), such as, for example, an LSD comprising surface relief holograms with random, non-periodic structures. In certain embodiments, one may use optical diffusers from Physical Optical Corporation, including those with the catalog numbers LSD-KIT-CN-x-y, where x is a diffuser angle chosen from 0.5, 1, 5, and 10° and where y is a diameter chosen from 25 and 50 mm.

According to certain embodiments, the invention provides a method to provide illumination of a target. According to certain embodiments, the method comprises generating light from a light source, directing the light with a first lens to a diffractive optical element, generating regulated light with the diffractive optical element, and focusing the regulated light with a second lens onto a selected area of the target.

According to certain embodiments, the invention provides a method to produce an optical response. According to certain embodiments, the method comprises generating light from a light source, directing the light with a first lens to a diffractive optical element, generating regulated light with the diffractive optical element, and focusing the regulated light with a second lens onto a selected area of a target, wherein the selected area comprises at least one optically active species. According to certain embodiments, the at least one optically active species comprises at least one fluorescent species.

According to certain embodiments, the invention provides an analysis method. The method comprises generating light from a light source, directing the light with a first lens to a diffractive optical element, generating regulated light with the diffractive optical element, delivering the regulated light onto a selected area of a target comprising at least one optically active species, and detecting changes in an optical signature of the at least one optically active species. According to certain embodiments, the at least one optically active species may optionally comprise at least one fluorescent species.

It is intended that the specification and examples be considered as exemplary only, with a true scope and spirit of the invention being indicated by the following claims.

What is claimed is:

1. An apparatus for illuminating a target, comprising:
    a light source comprising a coherent light source;
    a first lens configured to receive light from the light source;

a diffractive diffuser configured to receive the light from the first lens and to regulate the light into regulated light; and a second lens configured to receive the regulated light and to direct the regulated light onto a selected area of the target.

2. The apparatus of claim 1, wherein the light source is chosen from at least one of a laser, an electroluminescent light source, an chemoluminescent light source, an electrochemoluminescent light source, an incandescent light source, a fluorescent light source, an arc lamp, and a light emitting diode.

3. The apparatus of claim 1, wherein the light source is chosen from a gas laser, a solid state laser, a fiber optical laser, and an organic based laser.

4. The apparatus of claim 1, wherein the light source comprises at least a first light source and a second light source.

5. The apparatus of claim 4, wherein said first and second light sources respectively emit light having first and second optical spectrum, said second optical spectrum being different from said first optical spectrum.

6. The apparatus of claim 1, where the first lens is configured to collimate the light from the light source.

7. The apparatus of claim 1, wherein the second lens is configured to focus the regulated light to match a size of the selected area.

8. The apparatus of claim 1, wherein the second lens comprises a lens system configured to collimate the regulated light and to reduce the regulated light to a size matched to a size of the selected area.

9. The apparatus of claim 1, wherein the second lens comprises an objective lens.

10. The apparatus of claim 9, wherein the objective lens is further configured to collect light from the selected area.

11. The apparatus of claim 1, wherein the first and second lenses are independently chosen from refractive optical elements, reflective optical elements, and diffractive optical elements.

12. The apparatus of claim 1, wherein at least one of the first lens and the second lens is chosen from at least one cylindrical lens.

13. The apparatus of claim 1, wherein the diffractive diffuser comprises at least one diffractive optical element chosen from a transmission hologram, a reflection hologram, a plane hologram, a volume hologram, an absorption hologram, and a phase hologram.

14. The apparatus of claim 1, wherein the diffractive diffuser comprises at least one diffractive optical element chosen from an optically etched diffractive optical element, an embossed diffractive optical element, a molded diffractive optical element, and a chemically etched diffractive optical element.

15. The apparatus of claim 1, wherein the diffractive diffuser is configured to regulate the light and compensate for at least one of light intensity distributions and shapes of the light due to at least one of the light source and interaction of the light with optical elements of the apparatus.

16. The apparatus of claim 1, wherein the diffractive diffuser is configured to post-compensate for effects of elements optically prior to the diffractive diffuser and pre-compensate for effects of elements optically subsequent to the diffractive diffuser.

17. The apparatus of claim 1, further comprising an optical diffuser configured to remove speckle.

18. The apparatus of claim 17, wherein the optical diffuser is located between the first lens and the diffractive diffuser.

19. The apparatus of claim 17, wherein the optical diffuser is a rotating diffuser.

20. The apparatus of claim 1, wherein the regulated light is shaped to match a size and shape of the selected area.

21. The apparatus of claim 1, wherein the regulated light matches a size of the selected target area after focusing of the regulated light by the second lens.

22. The apparatus of claim 1, wherein the regulated light comprises a gradient intensity profile for substantially uniform illumination of the selected area at a non-normal angle of incidence.

23. The apparatus of claim 1, wherein the apparatus is configured to substantially uniformly illuminate a square-shaped selected area of the target at a non-normal angle of incidence; and wherein the diffractive diffuser generates trapezoidal shaped regulated light having an optical intensity gradient increasing toward a shorter parallel side of the trapezoidal shaped regulated light.

24. The apparatus of claim 1, wherein the apparatus is configured to substantially uniformly illuminate the selected area.

25. The apparatus of claim 1, wherein the diffractive diffuser regulates the light such that the regulated light has an intensity distribution suitable for substantially uniform illumination of the target.

26. The apparatus of claim 1, wherein the apparatus is configured to illuminate the selected area with an intensity variation of less than 50%.

27. The apparatus of claim 1, wherein the apparatus is configured to illuminate the selected area with an intensity variation of less than 10%.

28. The apparatus of claim 1, wherein the apparatus is configured to illuminate the selected area with an intensity variation of less than 5%.

29. The apparatus of claim 1, wherein the apparatus is configured to illuminate the selected area with an intensity variation of less than 1%.

30. The apparatus of claim 1, wherein the apparatus is configured to direct at least 1% percent of the light from the light source onto the selected area.

31. The apparatus of claim 1, wherein the apparatus is configured to direct at least 10% percent of the light from the light source onto the selected area.

32. The apparatus of claim 1, wherein the apparatus is configured to direct at least 25% percent of the light from the light source onto the selected area.

33. The apparatus of claim 1, wherein the apparatus is configured to direct at least 50% percent of the light from the light source onto the selected area.

34. The apparatus of claim 1, wherein the apparatus is configured to direct at least 75% percent of the light from the light source onto the selected area.

35. The apparatus of claim 1, wherein the apparatus is configured to direct at least 90% percent of the light from the light source onto the selected area.

36. The apparatus of claim 1, wherein the apparatus is configured to direct at least 10% percent of the light from the light source onto the selected area and to illuminate the selected area with an intensity variation of less than 25%.

37. The apparatus of claim 1, wherein the target comprises at least one optical fiber bundle.

38. The apparatus of claim 1, wherein the target comprises at least one microcard.

39. The apparatus of claim 1, wherein the target comprises at least one glass slide.

40. The apparatus of claim 1, wherein the target comprises an optical fiber bundle comprising separate wells at terminal ends of optical fibers of the bundle.

41. The apparatus of claim 1, wherein the target comprises at least one optically active species.

42. The apparatus of claim 41, wherein the at least one optically active species is chosen from quantum dots and colloidal particles.

43. The apparatus of claim 1, wherein the target comprises at least one luminescent species.

44. The apparatus of claim 1, wherein the target comprises at least one fluorescent species.

45. The apparatus of claim 1, wherein the target comprises at least one of a chemical recognition element and a biochemical recognition element.

46. The apparatus of claim 1, wherein the selected area comprises at least two spatially separate areas.

47. The apparatus of claim 1, wherein the selected area is rectangular.

48. The apparatus of claim 1, wherein the selected area is approximately 1 mm×1.5 mm.

49. An apparatus for illuminating a target, comprising:
a light source comprising at least one of a gas laser, a solid state laser, a fiber optical laser, and an organic based laser;
a first lens configured to receive light from the light source;
a diffractive diffuser configured to receive the light from the first lens and to regulate the light into regulated light; and
a second lens configured to receive the regulated light and to direct the regulated light onto a selected area of the target.

50. An apparatus for illuminating a target, comprising:
a light source comprising at least a first light source and a second light source;
a first lens configured to receive light from the light source;
a diffractive diffuser configured to receive the light from the first lens and to regulate the light into regulated light; and
a second lens configured to receive the regulated light and to direct the regulated light onto a selected area of the target.

51. The apparatus of claim 4, wherein said first and second light sources respectively emit light having first and second optical spectrum, said second optical spectrum being different from said first optical spectrum.

52. An apparatus for illuminating a target, comprising:
a light source;
a first lens configured to receive light from the light source;
a diffractive diffuser configured to receive the light from the first lens, to regulate the light into regulated light, and to post-compensate for effects of elements optically prior to the diffractive diffuser and pre-compensate for effects of elements optically subsequent to the diffractive diffuser; and
a second lens configured to receive the regulated light and to direct the regulated light onto a selected area of the target.

53. An apparatus for illuminating a target, comprising:
a light source;
a first lens configured to receive light from the light source;
a diffractive diffuser configured to receive the light from the first lens and to regulate the light into regulated light;
a second lens configured to receive the regulated light and to direct the regulated light onto a selected area of the target; and
an optical diffuser configured to remove speckle.

54. The apparatus of claim 53, wherein the optical diffuser is located between the first lens and the diffractive diffuser.

55. The apparatus of claim 53, wherein the optical diffuser is a rotating diffuser.

56. An apparatus for illuminating a target, comprising:
a light source;
a first lens configured to receive light from the light source;
a diffractive diffuser configured to receive the light from the first lens and to regulate the light into regulated light; and
a second lens configured to receive the regulated light and to direct the regulated light onto a selected area of the target,
wherein the regulated light is shaped to match a size and shape of the selected area.

57. An apparatus for illuminating a target, comprising:
a light source;
a first lens configured to receive light from the light source;
a diffractive diffuser configured to receive the light from the first lens and to regulate the light into regulated light; and
a second lens configured to receive the regulated light and to direct the regulated light onto a selected area of the target,
wherein the regulated light matches a size of the selected target area after focusing of the regulated light by the second lens.

58. An apparatus for illuminating a target, comprising:
a light source;
a first lens configured to receive light from the light source;
a diffractive diffuser configured to receive the light from the first lens and to regulate the light into regulated light; and
a second lens configured to receive the regulated light and to direct the regulated light onto a selected area of the target,
wherein the regulated light comprises a gradient intensity profile for substantially uniform illumination of the selected area at a non-normal angle of incidence.

59. An apparatus for illuminating a target, comprising:
a light source;
a first lens configured to receive light from the light source;
a diffractive diffuser configured to receive the light from the first lens and to regulate the light into regulated light; and
a second lens configured to receive the regulated light and to direct the regulated light onto a selected area of the target,
wherein the apparatus is configured to substantially uniformly illuminate a square-shaped selected area of the target at a non-normal angle of incidence; and wherein the diffractive diffuser generates trapezoidal shaped regulated light having an optical intensity gradient increasing toward a shorter parallel side of the trapezoidal shaped regulated light.

* * * * *